United States Patent
Kodama

(10) Patent No.: US 6,721,685 B2
(45) Date of Patent: Apr. 13, 2004

(54) REMOTE MAINTENANCE SYSTEM

(75) Inventor: Ryuichiro Kodama, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 312 days.

(21) Appl. No.: 09/811,930

(22) Filed: Mar. 19, 2001

(65) Prior Publication Data

US 2002/0045976 A1 Apr. 18, 2002

(30) Foreign Application Priority Data

Aug. 23, 2000 (JP) .................................... 2000-252206

(51) Int. Cl.[7] .............................................. G06F 15/00
(52) U.S. Cl. .................... 702/184; 702/177; 340/309.9; 340/993
(58) Field of Search ............................. 702/62, 81–84, 702/122, 177–185, 188, 187, FOR 111, FOR 112, FOR 134, FOR 135, FOR 137, FOR 139; 340/309, 988, 309.15; 455/445; 701/29, 117; 700/9, 19, 96, 241, 244

(56) References Cited

U.S. PATENT DOCUMENTS

| | | | | | |
|---|---|---|---|---|---|
| 4,404,641 | A | * | 9/1983 | Bazarnik ..................... | 702/177 |
| 4,884,054 | A | * | 11/1989 | Moon, Sr. ................ | 340/309.15 |
| 5,231,594 | A | * | 7/1993 | Knibiehler et al. .......... | 702/177 |
| 5,583,793 | A | * | 12/1996 | Gray et al. .................. | 709/223 |
| 5,586,050 | A | * | 12/1996 | Makel et al. ................. | 702/51 |
| 5,617,311 | A | * | 4/1997 | Easter et al. ................. | 700/80 |
| 5,929,601 | A | * | 7/1999 | Kaib et al. ................... | 320/113 |
| 6,006,171 | A | * | 12/1999 | Vines et al. ................. | 702/184 |
| 6,370,381 | B1 | * | 4/2002 | Minnick et al. ............. | 455/445 |
| 6,370,454 | B1 | * | 4/2002 | Moore .......................... | 701/29 |
| 6,480,783 | B1 | * | 11/2002 | Myr .............................. | 701/117 |
| 6,510,350 | B1 | * | 1/2003 | Steen et al. ..................... | 700/9 |
| 6,522,265 | B1 | * | 2/2003 | Hillman et al. .............. | 340/988 |

FOREIGN PATENT DOCUMENTS

| | | | |
|---|---|---|---|
| JP | 6-62130 | 3/1994 | |
| JP | 09-219891 | * 8/1997 | ............ H04Q/9/00 |
| JP | 10-229587 | 8/1998 | |

* cited by examiner

*Primary Examiner*—Marc S. Hoff
*Assistant Examiner*—Mohamed Charioui
(74) *Attorney, Agent, or Firm*—Kenyon & Kenyon

(57) ABSTRACT

A maintenance monitor mechanism 300 comprises of a maintenance control section 310 that controls and carries out remote maintenance of an apparatus-to-be-maintained, a maintenance history storage unit 320 that records maintenance history, and a display unit 350. The maintenance control section 310 acquires the date and time of the maintenance last carried out from the maintenance history storage unit 320 and displays "Maintenance Not Problematic" if the difference between the last maintenance date and time and the present date and time does not exceed a required maintenance interval or displays "Maintenance Problematic" if the difference exceeds the interval.

With said arrangement, it is possible to provide a remote maintenance system that informs the personnel in charge as to whether maintenance has been carried out surely and correctly and to definitely judge whether the apparatus is really in a usable condition.

5 Claims, 5 Drawing Sheets

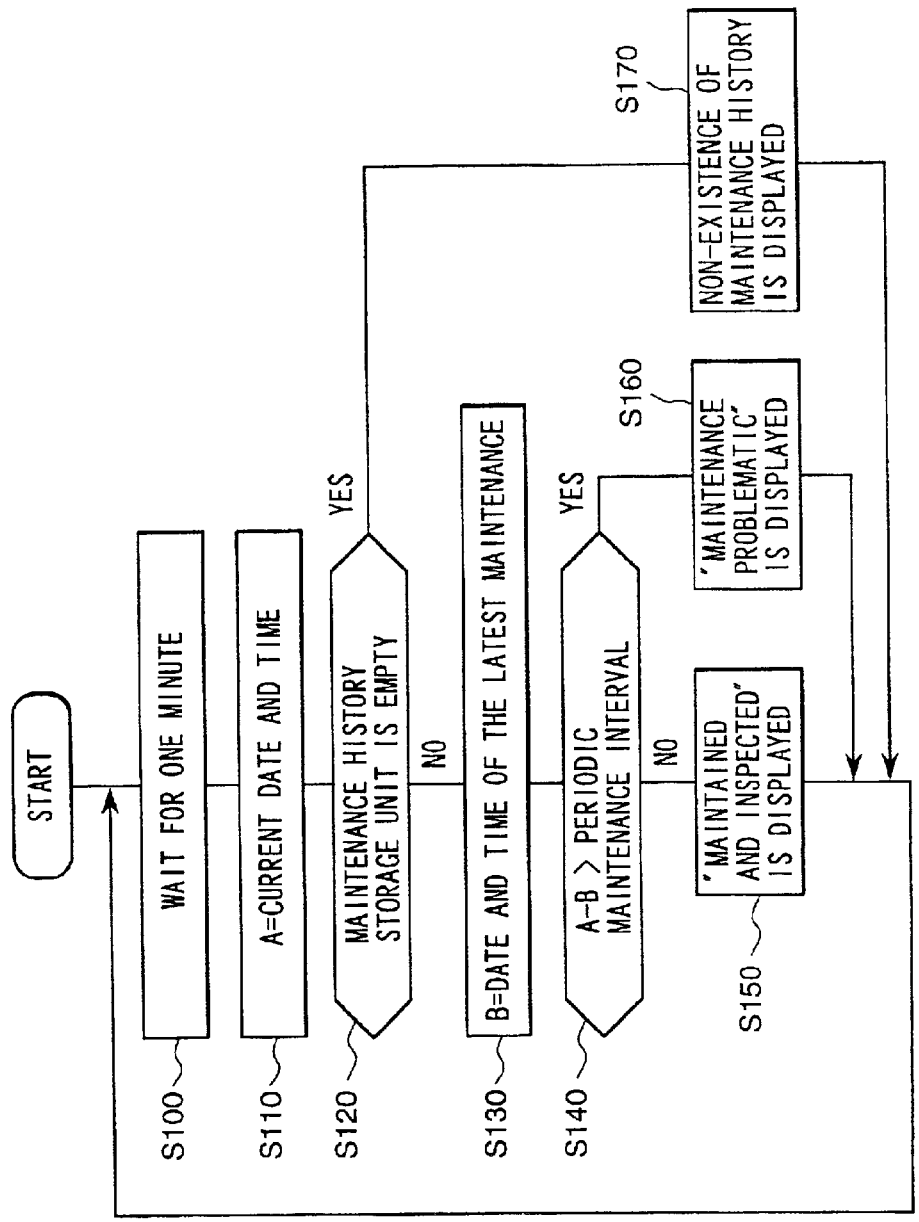

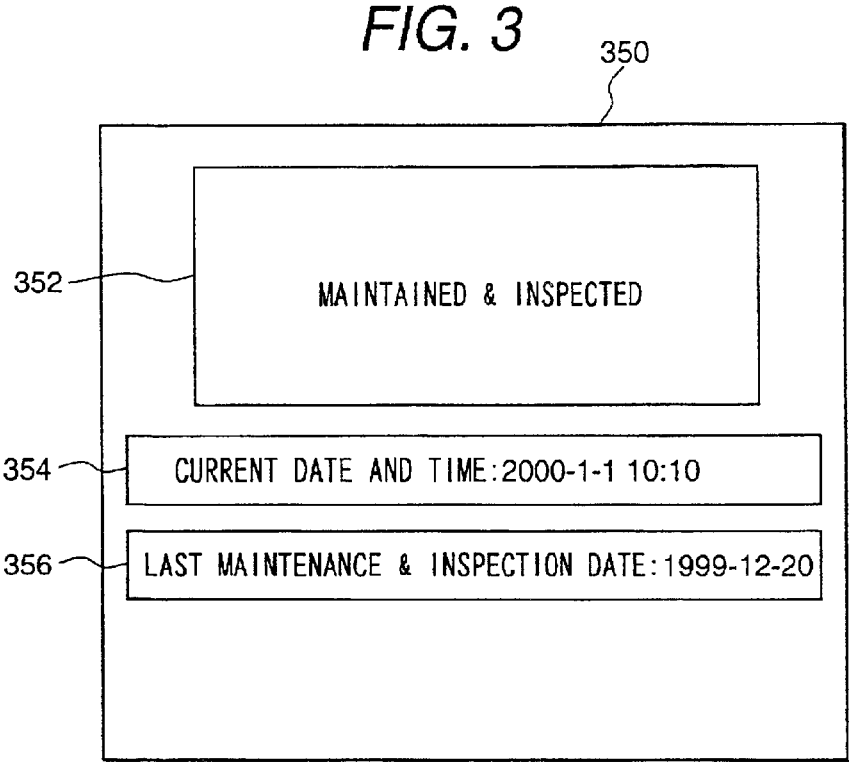
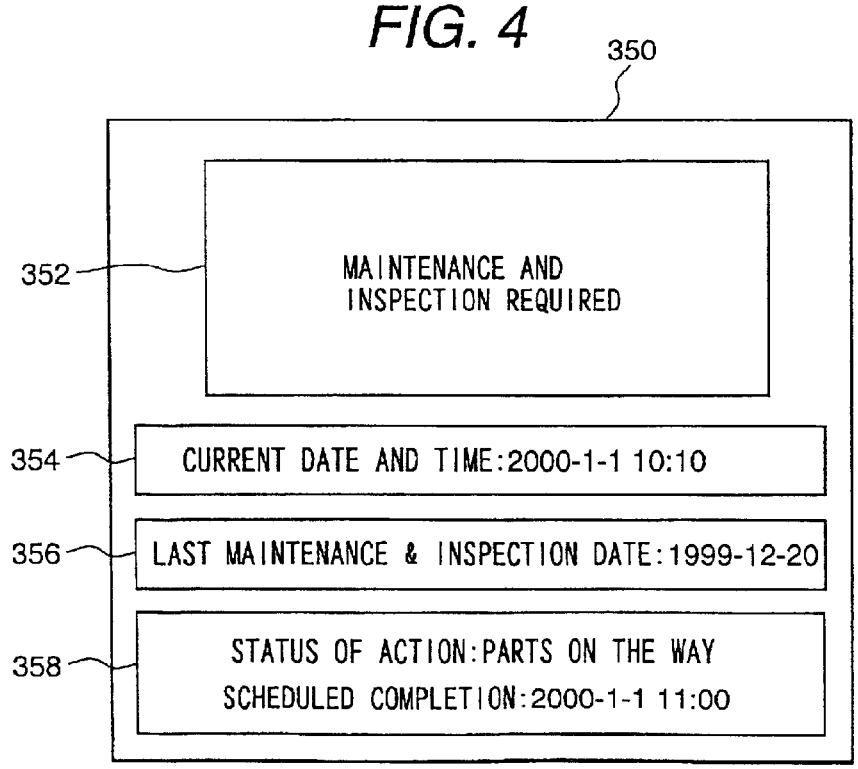

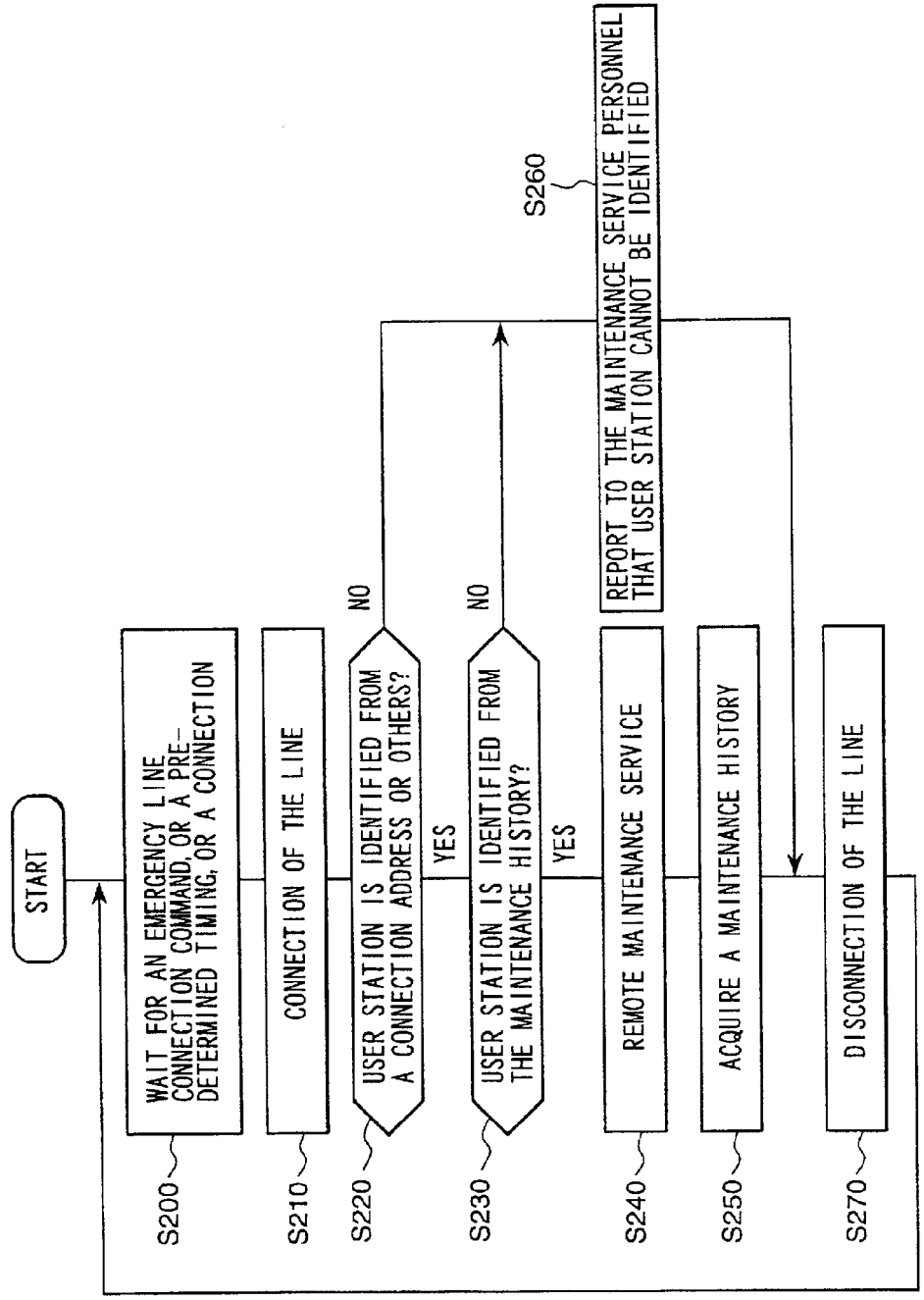

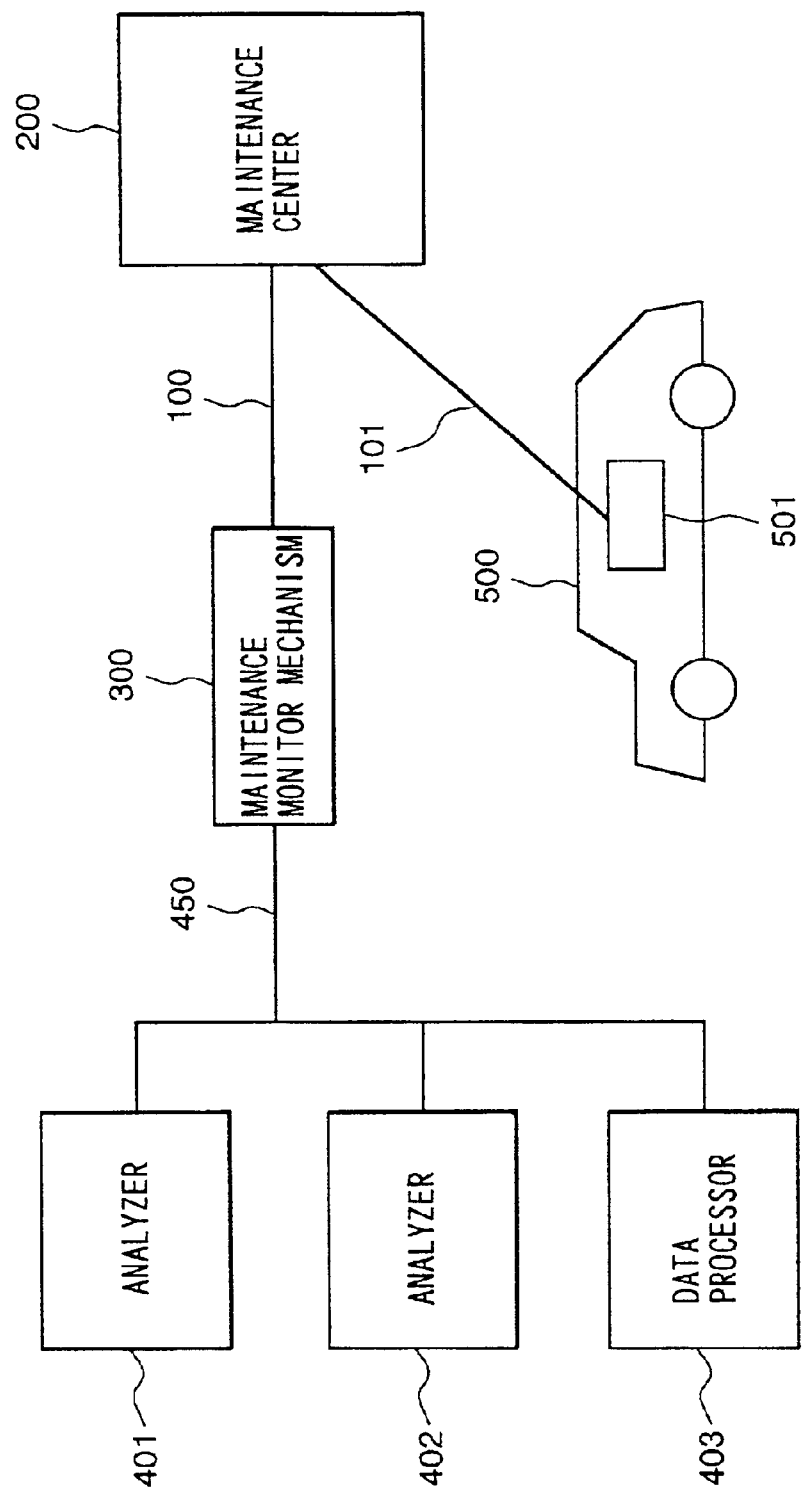

REMOTE MAINTENANCE SYSTEM

BACKGROUND OF THE INVENTION

The present invention relates to a remote maintenance system that prevents possible failure of an apparatus or detects a failure caused, and relates particularly to a remote maintenance system suitable for displaying the result of remote maintenance of general measuring equipment (hereinafter called an apparatus-to-be-maintained) including clinical inspection data analyzer or clinical inspection data processor.

Lately, with the advancement of network technology, it becomes easier to maintain an analyzer at a remote location through a network. Since the capacity of analyzer for clinical inspection has enhanced, effect on medical treatment resulting from a failure of analyzer has become more serious and it becomes necessary to find out the cause of the failure and, upon occurrence, repair the failure as soon as possible. For this reason, it becomes important to automate failure prevention by means of remote maintenance through a network and, further more, carry out real-time repair activities upon occurrence of a failure.

A known conventional remote maintenance system, for example, as disclosed in Japanese Application Patent Laid-Open Publication No. HEI 6-62130 (1994), has been such that a medical apparatus and a center in charge of the maintenance, inspection and management of the apparatus are connected by a telephone line and, when a failure detected in the medical apparatus is sent to the center, a repair command is sent from the center to the medical apparatus.

The system disclosed in Japanese Application Patent Laid-Open Publication No. HEI 6-62130 (1994), however, involves a problem on assurance of the quality of maintenance because explicit indication is not considered as to whether the apparatus has finally been maintained in a usable condition or when the apparatus becomes usable if it is under maintenance. For the persons engaged in clinical inspection who are in a position of managing the apparatus directly (hereinafter, those who directly manage the apparatus-to-be-maintained are generically called "personnel in charge"), it is necessary to operate the analyzer with the help of information not only on the progress of repair but on the result of repair and schedule of repair. In short, the repair result information and repair schedule information of the apparatus are very important to carry out clinical inspection in practice but the afore-mentioned prior art lacks in this information.

The conventional system involves another problem on assurance of the quality of maintenance because no consideration is given to possible uneasiness of the personnel in charge resulting from a lack of explicit indication as to whether sure and proper maintenance has really been carried out in the remote maintenance that is not attended with actual actions by operators. Generally, in case of remote maintenance where maintenance activities are automated, it holds true that the personnel managing the apparatus directly do not feel any progress of maintenance actually and so feel uneasy about the completion of maintenance because the personnel cannot confirm the quality of maintenance visually. In the past, the personnel in charge were able to assure themselves of the timing and progress of maintenance on an occasion of a visit of maintenance service persons and actual maintenance activities by them, and accordingly can feel the completion of maintenance in actuality. In the remote maintenance, however, the personnel cannot have this actual feeling.

The objective of the present invention is to provide a remote maintenance system which informs the personnel in charge that maintenance has been carried out surely and properly and enables the personnel in charge to definitely judge whether the apparatus is really in a usable condition.

SUMMARY OF THE INVENTION (1) In order to realize the above object, the present invention provides a remote maintenance system in which a maintenance center in charge of remote maintenance is connected to an apparatus-to-be-maintained by a communication channel and a maintenance monitor mechanism is installed in the apparatus-to-be-maintained or on the communication channel; wherein the maintenance monitor mechanism comprises of a maintenance control section that controls and carries out remote maintenance of the apparatus-to-be-maintained, a maintenance history storage unit that records maintenance history, and a display unit; and the remote maintenance system acquires the date and time of the maintenance last carried out from the maintenance history storage unit and displays "Maintenance Not Problematic" if the difference between the date and time of the maintenance and the current date and time does not exceed a required maintenance interval or displays "Maintenance Problematic" if the difference exceeds the interval.

With this configuration, it becomes possible to inform of the personnel in charge that maintenance has been carried out surely and properly and enable the personnel in charge to definitely judge whether the apparatus is really in a usable condition.

(2) That in (1) above is provided, wherein, preferably, the date and time of the last maintenance out of those that were carried out with no problem found concerning utilization of the apparatus is used instead of the date and time of the maintenance last carried out.

(3) That in (1) above is provided, wherein, preferably, the system contains different required maintenance intervals dependent upon the type of maintenance controlled by the maintenance control section, and switches the required maintenance interval corresponding to each type of maintenance and displays "Maintenance Problematic/Not Problematic".

(4) That in (1) above is provided, wherein, preferably, the system displays restrictions concerning utilization of the apparatus in case of "Maintenance Problematic".

(5) That in (1) above is provided, wherein, preferably, the system displays current status if maintenance activity is being carried out in case of "Maintenance Problematic".

(6) That in (5) above is provided, wherein, preferably, if any restriction concerning utilization of the apparatus is caused, the system displays the restriction.

(7) That in (1) above is provided, wherein, preferably, at the request of an operator, the system judges whether the difference exceeds the required maintenance interval and displays accordingly.

(8) That in (1) above is provided, wherein, preferably, the system judges whether the battery in the maintenance monitor mechanism or in the apparatus-to-be-maintained has run down and displays the result of the judgment.

(9) That in (1) above is provided, wherein, preferably, the system judges whether the current date and time of the timer in the maintenance monitor mechanism or in the apparatus-to-be-maintained is correct and displays the result of the judgment.

(10) That in (1) above is provided, wherein, preferably, the system is equipped with a GPS (Global Positioning System) installed inside a mobile vehicle in charge of maintenance activity, and transmits and displays the current position data of the mobile vehicle from the GPS to the display unit via the communication channel.

(11) That in (1) above is provided, wherein, preferably, the system calculates the hours required until the arrival of the mobile vehicle at the location of the apparatus-to-be-maintained, and transmits and displays the required hours on the display unit.

(12) That in (1) above is provided, wherein, preferably, the system is equipped with a maintenance history storage unit installed in the maintenance center, and, when the communication channel between the maintenance center and the apparatus-to-be-maintained is connected, compares the maintenance history recorded in the maintenance history storage unit in the maintenance center at the last connection of the communication channel to the maintenance history recorded in the maintenance history storage unit in the maintenance monitor mechanism, and carries out remote maintenance if the two records agree with each other or shuts down the communication channel if not.

(13) That in (1) above is provided, wherein, preferably, the system displays the maintenance histories in the maintenance history storage unit on the display unit.

(14) That in (1) above is provided, wherein, preferably, the system displays the required maintenance interval, current time of the timer, and maintenance history in the maintenance history storage unit, either in strings of numeric numbers of the frequency distribution calculated per specified unit time or in a form of distribution histogram charting the strings of numeric numbers in time series, on the display unit.

BRIEF DESCRIPTION OF THE DRAWINGS

FIG. 2 is a flowchart showing the maintenance monitor processing operation by a maintenance monitor mechanism of a remote maintenance system according to an embodiment of the present invention:

FIG. 3 is an explanatory sketch showing an example of display on a display unit in a remote maintenance system according to an embodiment of the present invention:

FIG. 4 is an explanatory sketch showing an example of display on a display unit in a remote maintenance system according to an embodiment of the present invention:

FIG. 5 is a flowchart showing the maintenance processing operation by a maintenance center of a remote maintenance system according to an embodiment of the present invention: and FIG. 6 is a block diagram showing the configuration of a remote maintenance system according to another embodiment of the present invention.

DETAILED DESCRIPTION OF EMBODIMENTS OF THE INVENTION

Figure 1:
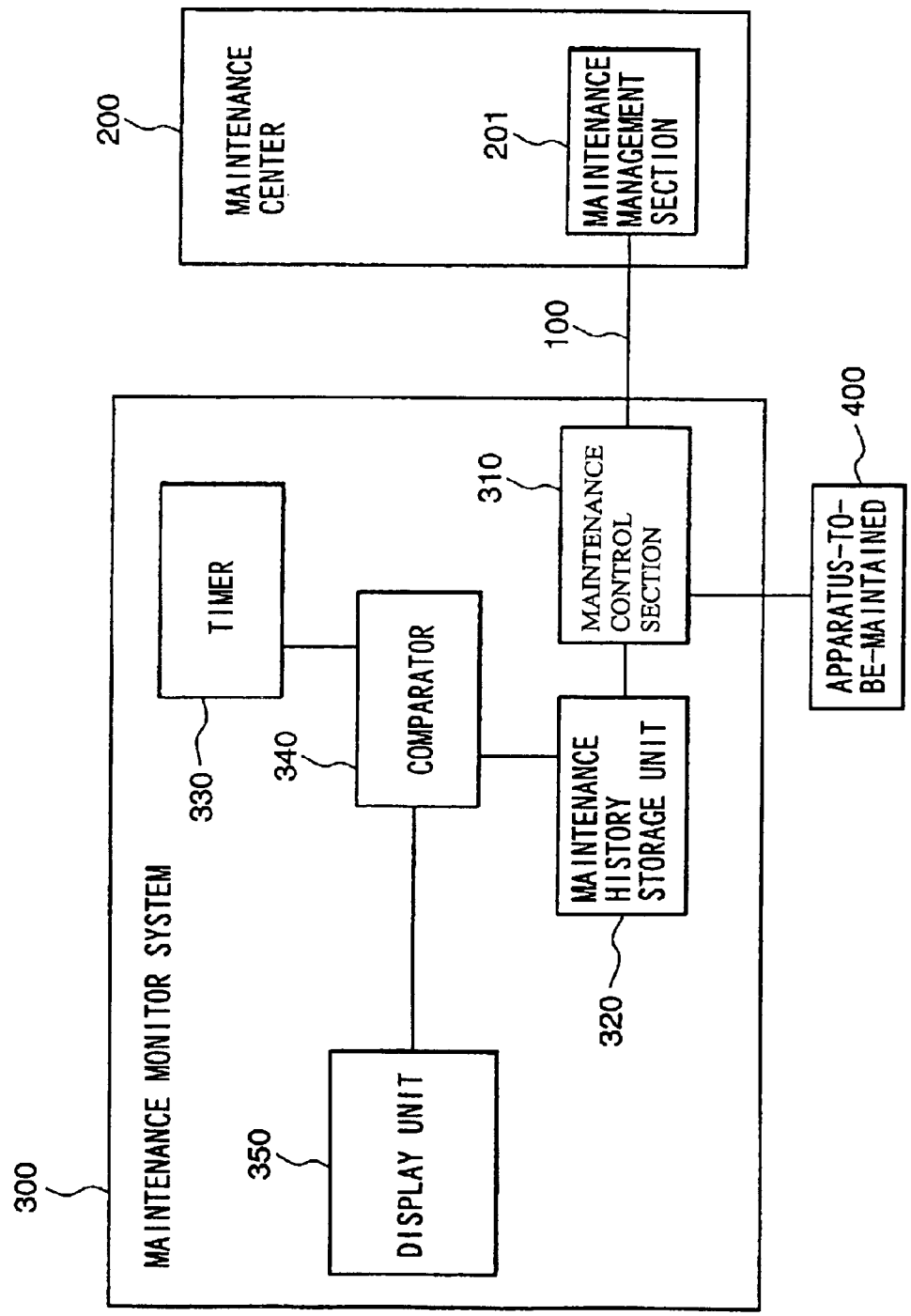
FIG. 1 is a block diagram showing the configuration of a remote maintenance system according to an embodiment of the present invention.

The configuration and operation of a remote maintenance system according to an embodiment of the present invention are explained hereunder, using FIG. 1 to FIG. 5.

First, the configuration of a remote maintenance system according to an embodiment of the present invention is explained, using FIG. 1.

FIG. 1 is a block diagram showing the configuration of the remote maintenance system according to an embodiment of the present invention.

A maintenance monitor mechanism 300 that carries out and monitors remote maintenance and a maintenance management section 201 that manages individual apparatus-to-be-maintained in a maintenance center 200 at a remote location are connected by a communication channel 100.

The maintenance monitor mechanism 300 is equipped with a maintenance control section 310, maintenance history storage unit 320, timer 330, comparator 340, and display unit 350. The maintenance control section 310 carries out maintenance of an apparatus-to-be-maintained 400. The maintenance control section 310 carries out maintenance of the apparatus-to-be-maintained 400 in reply to a maintenance command from the maintenance management section 201 or on its own initiative.

Here, the apparatus-to-be-maintained 400 includes, for example, analyzer and data processor used in clinical inspection. Analyzer means, for example, a biochemical analyzer in which specimen and reagent are mixed together and the absorbance of the mixture is measured by a multi-wavelength photometer set at a suitable wavelength for each analysis item. An analyzer like the above comprises of a mechanism for placing a specimen separately into a reaction container, mechanism for pouring reagent into the reaction container, mechanism for stirring the mixture in the reaction container, multi-wavelength photometer for measuring the absorbance of the mixture in the reaction container, mechanism for washing the reaction container after use, operating section for entering analysis items required for each specimen and instructing start or end of the analysis, and the like. Data processor connected to an analyzer by a communication line, for example, sends the request information to the analyzer as to which specimen is to be analyzed on what analysis item and receives the result information as to what result is obtained from which specimen, enabling to enter, store, update and report the above information.

When maintenance has been carried out, the maintenance control section 310 of the maintenance monitor mechanism 300 records the history in the maintenance history storage unit 320. Record contains the date and time of the maintenance and whether any problem is found in the apparatus-to-be-maintained through the maintenance.

The comparator 340 acquires the current date and time from the timer 330 that clicks and indicates date and time on real time. The date and time information contains current year, month, day, hour, minute, and second. Further, the comparator 340 acquires the date and time of the maintenance last carried out (hereinafter called the last maintenance date and time) from the maintenance history storage unit. The comparator 340 calculates the difference between the acquired current date and time and last maintenance date and time, and displays "Maintenance Not Problematic" on the display unit 350 if the difference does not exceed a required periodic maintenance interval or displays "Maintenance Problematic" on the display unit 350 if the difference exceeds the interval. An interval of maintenance to be carried out next is specified in periodic maintenance and, if none is carried out within this interval, it means delay of maintenance. In order to inform that the quality of periodic maintenance has been lost, "Maintenance Problematic" is displayed on the display unit 350.

The maintenance monitor processing operation by the maintenance monitor mechanism 300 of the remote maintenance system according to the embodiment is explained hereunder, using FIG. 2 to FIG. 4.

FIG. 2 is a flowchart showing the maintenance monitor processing operation by the maintenance monitor mechanism 300 of a remote maintenance system according to an embodiment of the present invention. FIGS. 3 and 4 are explanatory sketch showing an example of display on the display unit in a remote maintenance system according to an embodiment of the present invention.

First, in step S100, the maintenance control section 300 of the maintenance monitor mechanism 310 waits for one minute. That is, the maintenance monitor processing of the embodiment operates in one-minute cycle. This cycle is not necessarily limited to one minute, but can be shorter or longer than one minute provided that the freshness of the maintenance quality displayed meets the requirement. An object of a wait in step S100 can be anything that generally provides updating timing. For example, waiting until a specified time or waiting for an explicit command from the operator is acceptable.

Next, in step S110, after the wait time in step S100 has elapsed, the maintenance control section 310 acquires the present date and time and stores it in register A.

Next, in step S120, the maintenance control section 310 judges whether the maintenance history storage unit 320 is empty or not. When the maintenance monitor mechanism 300 is first operated after installation in a system, the maintenance history storage unit 320 is empty because no maintenance has ever been carried out. Besides, it is anticipated that the maintenance history storage unit is made empty by some chance by illegal hacking. If the maintenance history storage unit 320 is empty as above, the processing proceeds to step S170 and non-existence of maintenance history is displayed on the display unit 350. If not empty, the processing proceeds to step S130.

If the processing in step S130, which is to be explained later, is changed so as to acquire the date and time of the last maintenance out of those that were carried out with no problem found in the apparatus-to-be-maintained, there may be a case where no applicable maintenance history is stored. Existence of such history is checked in step S120 and, if none, non-existence is displayed in step S170.

If the maintenance history storage unit 320 is not empty, in step 130, the maintenance control section 310 acquires the date and time of the maintenance last carried out from the maintenance history storage unit 320 and stores it in register B. It is possible to change this step S130 so as to acquire the date and time of the last maintenance out of those that were carried out with no problem found in the apparatus-to-be-maintained. With this change, more practical quality of maintenance can be displayed.

Next, in step S140, the maintenance control section 310 compares the time difference (A–B) between the present date and time, stored in register A, and the date and time of the maintenance last carried out, stored in register B, to a periodic maintenance interval. Here, (A–B) represents the time that has elapsed with no maintenance carried out. The processing proceeds to step S160 if the time exceeds the periodic maintenance interval, or to step S150 if not.

If the time (A–B) that has elapsed with no maintenance carried out exceeds the periodic maintenance interval, it means that periodic maintenance has not been carried out punctually. Accordingly, in step S160, the maintenance control section 310 displays "Maintenance Problematic" on the display unit 350.

If the time does not exceeds the interval, it means that periodic maintenance has been carried out punctually and that the apparatus-to-be-maintained is not problematic. Accordingly, in step S150, the maintenance control section 310 displays "Maintained and Inspected" on the display unit 350.

An example of display concerning "Maintenance Not Problematic" is explained hereunder, using FIG. 3.

In order to show that no failure is found in maintenance and inspection, "Maintained and Inspected" is displayed on a maintenance condition display area 352. In order to show the status of periodic maintenance in detail, the present date and time is displayed on a display area 354 and the date of the maintenance last carrier out or date of the last maintenance out of those that were carried out with no problem found in the apparatus-to-be-maintained is displayed on a display area 356.

The purpose of displaying the present date and time on the display area 354 is not only to visually confirm the difference from the last maintenance and inspection date but to visually check normal operation of the timer 330 and to monitor the date and time which may have been altered by some chance by illegal hacking. In particular, considering a risk of data crack by illegal hacking as in the latter case, it will be preferable to show the contents of the maintenance history storage unit or pre-determined periodic maintenance interval.

The timer 330 may operate incorrectly and display other past date and time than the present, resulting from running down or the like of a battery driving the timer. Since the time difference (A–B) in step S140 is shown as a negative value on this occasion, displaying an alarm in case (A–B) is negative enables to report the above failure of the timer 330 indirectly.

Another means for detecting incorrect operation of the timer 330 would be such that the maintenance center 200 accesses the maintenance monitor mechanism 300 by communication 100, reads the indication of the timer 330, and judges whether the difference between the indication and the present time controlled by the maintenance center is within an allowable limit. Displaying this error on the display unit 350 or reporting it to the operator in the maintenance center if not allowable enables to prevent an error of the timer 330. Besides, since the timer 330 is normally driven by a battery inside, incorrect operation of the timer 330 can be prevented by checking whether the battery driving the timer has run down instead of checking the present time acquired from the timer.

The timer 330 is located inside the maintenance monitor mechanism 300 in an example shown in FIG. 1 but not limited thereto, and, for example, it is acceptable to commonly use a timer incorporated in the apparatus-to-be-maintained. The contents of the maintenance history storage unit 320 are displayed by descriptions in character strings but some other ways are also acceptable; displaying a total number of times of maintenance or displaying a number of times of maintenance by a chart in time series.

Next, an example of display concerning "Maintenance Problematic" is explained here under, using FIG. 4. In order to show that a problem is found in maintenance, "Maintenance and Inspection Required" is displayed on the display area 352 of the display unit 350. The present status of the required action and the expected date of repair are also displayed on a display area 358. This example shows that the parts necessary for repair are on the way of transportation and the repair is scheduled for completion at 11:00 on Jan. 1, 2000.

Pieces of information displayed as above can be more accurate by using, through the communication channel 100, the latest information on the maintenance activities accumulated in the maintenance center 200. Besides, it will be preferable to display a scheduled visit of a maintenance service person so as to inform of expected completion of repair. It will also be preferable by way of preventive maintenance to display a notice about a part that is judged advisably necessary to be replaced soon.

The date and time is displayed in a clock format (year, month, day, hour, minute, and second) in the examples above, but remaining hours until the target date and time can be utilized instead. For example, it will be preferable to display the remaining hours until when a maintenance service person visits or remaining hours until when the next maintenance is carried out.

Whether maintenance is problematic or not is expressed in character strings in the examples above, but other ways of display will also be acceptable. In addition, it will be preferable to utilize explicit perceptible means such as color, graphics, animation, alarm sound and light as a means for describing a problem in maintenance and inspection. With these means, more effective report of the problem can be issued. As a more direct means, notice by a pager, e-mail or voice message will be preferable.

In order to improve the quality of periodic maintenance displayed, it is preferred in acquiring the last maintenance date not to simply find out the maintenance last carried out but to find out the last periodic maintenance out of those that were carried out with no problem found in the apparatus-to-be-maintained, thus enabling to report a status even with unsolved problem to the personnel in charge.

Although it is periodic maintenance that is displayed of its maintenance quality in the example above, the quality of occasional maintenance can also be displayed as more general maintenance provided that the history is stored in the maintenance history storage unit and the periodic maintenance interval applied in the comparator 340 is replaced with an interval allowable to the personnel in charge. With the help of the displayed information as above, the personnel in charge can easily understand the quality of remote maintenance of the apparatus.

In general remote maintenance, a piece of operating information of an apparatus-to-be-maintained is referred to and a system makes a judgment of carrying out an actual maintenance action if a calculated value concerning the information exceeds an allowable limit. Operating information means record the condition of an apparatus-to-be-maintained while the power to the apparatus is on. The operating information includes periodic maintenance information necessary for carrying out periodic inspection of the apparatus, failure information on failures detected and recorded by the apparatus automatically, and analytical environment tracing information collected by an analyzer in carrying out an analysis. The periodic maintenance information includes operating hours of the apparatus, number of times of operation of a special mechanism such as a syringe mechanism for dispensing a specimen to reaction vessels, and history of the maintenance carried out manually by the personnel in charge. The failure information includes a record of alarm codes corresponding to a failure detected by the apparatus and a record of parameters upon occurrence of the failure. The analytical environment tracing information includes an operating record of the mechanism, alarm on the measured data, and parameters needed for the calculation of the measured data. The operating information as above is interpreted in the maintenance control section 310 or maintenance management section 210 to a certain judgment criterion and linked to the maintenance activities, such as replacement of parts of the apparatus, as needed. It is not always limited to a judgment of the operation information that is covered by the remote maintenance according to this embodiment, but general maintenance activities of the apparatus-to-be-maintained that can be operated from a remove point are covered.

It is only one set of maintenance monitor mechanism 300 that is connected to the maintenance center 200 in an example shown in FIG. 1, but not always limited thereto. Generally, multiple analyzers or data processors in multiple hospitals or analysis centers are connected to the maintenance center 200. Besides, multiple maintenance centers can be installed for different types of maintenance. In addition, the maintenance monitor mechanism and the apparatus-to-be-maintained are separate in FIG. 1 but it is not always necessary. For example, whole or part of the maintenance monitor mechanism can be incorporated in the apparatus-to-be-maintained. In this case, for example, the display unit 350 can be realized by common use of a display unit originally installed on the apparatus-to-be-maintained. It is also acceptable that the maintenance monitor mechanism is included in the maintenance center, where the maintenance monitor mechanism is connected to one or more apparatuses M. In other way, the maintenance monitor mechanism may be connected to multiple apparatuses M and displays the quality of maintenance of the multiple apparatuses. In this case, each apparatus can be equipped with a maintenance history storage unit 320 and a comparator 340 so as to monitor each apparatus differently. In a similar way as above, occasional maintenance can be monitored of its performance as is the periodic maintenance if a maintenance history storage unit is installed separately and occasional maintenance information is inputted through the maintenance center or from a data entry device of the maintenance monitor mechanism.

Further, there may happen a case where the periodic maintenance interval is different among multiple maintenance services to be carried out for the same apparatus-to-be-maintained. Even in this case, it becomes possible to carry out and monitor multiple maintenance services of various types if a periodic maintenance interval applied in the comparator 340 is kept for each type of maintenance service and the applicable periodic maintenance interval is added to the history information in the maintenance history storage unit. Even in a case where a single maintenance service is to be carried out but the applicable periodic maintenance interval needs to be modified, it becomes possible if a data entry device for the modification is provided on the maintenance monitor mechanism or the periodic maintenance interval is modified from the maintenance center by remote communication.

Next, the maintenance processing operation by the maintenance center 200 of the remote maintenance system according to the embodiment is explained hereunder, using FIG. 5.

FIG. 5 is a flowchart showing the maintenance processing operation by the maintenance center of a remote maintenance system according to an embodiment of the present invention.

First, in step S200, the maintenance management section 201 of the maintenance center 200 waits for a primary factor for carrying out remote maintenance. Remote maintenance is carried out due to a primary factor that the maintenance service personnel of the maintenance center needs to carry out maintenance for emergency, maintenance (including periodic maintenance) is to be carried out automatically at a timing pre-determined by the maintenance center, or a request for maintenance (including periodic maintenance if periodic maintenance control is included in the maintenance monitor mechanism) is issued from the maintenance monitor mechanism installed at the apparatus-to-be-maintained.

When one of the above is caused, the maintenance management section 201 connects the line in step S210.

Next, in step S220, the maintenance management section 201 identifies a user station on the other end of the line by the connection address of the line or the apparatus ID (a unique identifier for identifying each apparatus) held in the maintenance monitor mechanism or apparatus-to-be-maintained. Particularly when the line is connected at the request of the maintenance center, whether the identified user station is identical with the expected user station is checked. If it is identical, the processing proceeds to step S230 and, if not, to step S260.

Even when the line is connected at the request of others than the maintenance center, a similar processing is operated so as to ensure that the user station on the line is registered in the maintenance center as an apparatus-to-be-maintained.

After the user station is identified as above, the maintenance management section 201 then identifies the user station by the maintenance history in step S230. If a remote maintenance service had been carried out at the time of previous line connection, maintenance history in the maintenance history storage unit must have been acquired already. So, the maintenance history acquired at that time is compared to the maintenance history of the user station in question. If they are identical, the processing proceeds to step S240 and, if not, to step S260.

If the two histories are identical, the user station can be identified as the expected user station. So, in step S240, the maintenance management section 201 carries out a remote maintenance service.

Then, in step S240, the maintenance management section 201 acquires the maintenance history.

After the above, in step S270, the maintenance management section 201 disconnects the line.

If a judgment either in step S220 or in step S230 results in no identity, it is likely that the maintenance history storage unit has been illegally modified or the connection is made with a wrong user station. In step S260, therefore, the maintenance management section 201 reports impossibility of identification to the maintenance service personnel so as to initiate investigation and remedial action by maintenance service persons Detection of no identity as above can be fed back to the apparatus-to-be-maintained so as to display "Maintenance Problematic" on the display unit 350.

Then, in step S270, the maintenance management section 201 disconnects the line.

Comparison of the maintenance history can be that of the last maintenance history, several latest ones, whole, or part. In case a maintenance center is engaged only in specific maintenance, only those specific maintenance histories can be picked up for comparison.

According to the embodiment, as explained above, by acquiring the date and time of the maintenance last carried out from the maintenance history storage unit and displaying "Undergone Periodic Maintenance" if the difference between the above and the current date and time does not exceed a periodic maintenance interval or displaying "Periodic Maintenance Required" if the difference exceeds the interval, it becomes possible to inform the personnel in charge clearly that the quality of the apparatus-to-be-maintained has been kept assured by the maintenance. In other words, since the result of periodic maintenance is checked into the history and then the quality is displayed, the personnel in charge can easily confirm that the quality has been kept assured. This method applies not only to periodic maintenance but to occasional maintenance, wherein the quality can also be displayed as above and accordingly the personnel in charge can easily confirm the quality if necessity and completion of maintenance are reflected on the maintenance history as needed.

The same effect as above can be expected by acquiring the date and time of the last maintenance out of those that were carried out with no problem of the apparatus found from the maintenance history storage unit and checking the difference between the above and the present date and time in the same manner as explained above.

Where specific maintenance is under way in the maintenance control section, if present status of the maintenance, restriction on utilization of apparatus, and expected completion date and time of the maintenance are displayed on the display unit, the personnel in charge can easily predict a timing of release from the restriction on utilization of the apparatus due to the maintenance. Further, where an actual maintenance action (e.g. replacement of parts) is needed, if detailed restriction on utilization of apparatus resulting from the maintenance and expected timing of release from the restriction are displayed, the personnel in charge can form an alternative plan more easily and loss due to the restriction can be made minimal.

If the content of the maintenance history storage unit is kept in the maintenance center each time when a maintenance command is issued from the maintenance center and a maintenance history is recorded in the maintenance history storage unit, and if it is ensured at the next time when the apparatus is connected to the maintenance monitor mechanism for maintenance that the content of the maintenance history storage unit has not been changed, it becomes possible to ensure that the maintenance monitor mechanism has not been utilized illegally for other purposes and that the user station connected from the maintenance center via the communication channel is correct.

Besides, if multiple apparatuses M are connected and/or multiple maintenance centers for different purposes of maintenance are installed, coverage and efficiency of maintenance can be enhanced. There may be a case where maintenance requires multiple inspections with different periodic maintenance intervals, but this diversification in maintenance can also be managed if multiple periodic maintenance intervals are prepared and assured implementation of maintenance in those intervals is monitored. Display of the quality of maintenance should not always be periodic but, for example, the quality may be displayed from time to time by a request from the personnel in charge by pressing a key or switch. Thus, the personnel in charge can recognize the quality of maintenance on a timely basis.

In identifying an apparatus to be maintained by remote maintenance, comparing the maintenance history in the maintenance history storage unit with that in the maintenance center enables not only to ensure identification of the apparatus-to-be-maintained and prevent deterioration of the quality of the apparatus resulting from possible maintenance on wrong apparatus-to-be-maintained but also to ensure that the maintenance function has not been utilized illegally through the network and, if it has been, cooperate in taking necessary actions so as to prevent illegal utilization.

Further more, displaying the contents of the maintenance history storage unit, periodic maintenance interval, current time of the timer, and histogram of number of times of maintenance enables to check and ensure that maintenance has been carried out surely and no illegal utilization has been made. Besides, check of running down of a battery driving the timer and check of the present time of the timer enable to monitor maintenance more strictly. Displaying the content of the maintenance history storage unit allows the personnel in charge to recognize the progress of maintenance.

Next, the configuration and operation of a remote maintenance system according to another embodiment of the present invention is explained hereunder, using FIG. 6.

FIG. 6 is a block diagram showing the configuration of the remote maintenance system according to another embodiment of the present invention. The same symbol as in FIG. 1 represents the same portion.

A maintenance monitor mechanism 300 is connected, via a communication channel 450, to multiple apparatuses M: analyzers 401 and 402, and data processor 403. The maintenance monitor mechanism 300 monitors maintenance of these three apparatuses.

A maintenance center 200 is connected, via a communication channel 101, to a GPS (Global Positioning System) 501 inside a maintenance service car 500. It is possible to determine, with the aid of the GPS 501, where the maintenance service car is located at present and send and display the geographical information or expected arrival time at an apparatus-to-be-maintained on the maintenance monitor mechanism via the maintenance center 200. With this function, even in case an apparatus has failed and a maintenance service such as replacement of parts is needed, the user of the apparatus can precisely predict the time of recovery from the failure and, by forming a plan based on the prediction, deterioration of medical services resulting from the failure can be made minimal.

According to the embodiment, in addition to the effect of the embodiment as explained above, accuracy in predicting the expected completion of maintenance can be further improved by calculating the expected arrival time from the geographical position of a maintenance person or maintenance parts on the GPS.

Displaying the two-dimensional geographical information and current position information from the GPS on the display unit as they are allows the personnel in charge to feel safer.

According to the present invention, it is possible to inform the personnel in charge as to whether maintenance has been carried out surely and correctly and enable to definitely judge whether the apparatus is really in a usable condition.

What is claimed is:

1. A remote maintenance system, in which a maintenance center in charge of remote maintenance is connected to an apparatus-to-be-maintained with a communication channel, and a maintenance monitor mechanism is installed in the apparatus-to-be-maintained or on the communication channel, wherein the maintenance monitor mechanism comprises:
  a maintenance control section that controls and carries out remote maintenance of the apparatus-to-be-maintained, and
  a display unit;
a maintenance history storage unit is installed in the maintenance center; and
when the communication channel between the maintenance center and the apparatus-to-be-maintained is connected, the maintenance history storage unit compares the maintenance history recorded at the last connection of the communication channel in the maintenance history storage unit in the maintenance center with the maintenance history recorded in the maintenance history storage unit in the maintenance monitor mechanism, and if the two records match each other, the remote maintenance is carried out, and if the two records do not match each other, the communication channel is shut down.

2. A remote maintenance system according to claim 1, wherein
the latest date of maintenance performed is output from the maintenance history storage unit, and
if the difference between the present date and the latest date of maintenance performed is equal to or shorter than the required maintenance interval, an indication of NO PROBLEMS IN MAINTENANCE is displayed, and
if the difference is longer than the required maintenance interval, an indication of PROBLEM IN MAINTENANCE is displayed.

3. A remote maintenance system according to claim 2, wherein
the latest date of maintenance among current maintenance dates in which no problem has been found is utilized instead of the latest date of maintenance performed.

4. A remote maintenance system according to claim 1, wherein
the maintenance history in the maintenance history storage unit is displayed on the display.

5. A remote maintenance system according to claim 1, wherein at least one of:
  a required maintenance interval,
  a current time of the timer, and
  a maintenance history in the maintenance history storage unit, either in strings of numeric values of the frequency distribution calculated per specified unit time, or in a form of distribution calculated per specified unit time, or in a form of distribution histogram charting the strings of numeric values in time series, is displayed in the display.

* * * * *